United States Patent [19]
Guyder

[11] Patent Number: 5,363,308
[45] Date of Patent: Nov. 8, 1994

[54] METHOD FOR AUTOMATING THE OPTIMIZATION OF TOOL PATH GENERATION FOR PROFILE MILLING

[75] Inventor: Margaret K. Guyder, Delanson, N.Y.

[73] Assignee: General Electric Company, Schenectady, N.Y.

[21] Appl. No.: 984,627

[22] Filed: Dec. 2, 1992

[51] Int. Cl.$^5$ ............................................. G06F 15/46
[52] U.S. Cl. ........................... 364/474.29; 364/474.28; 318/570
[58] Field of Search ........... 364/479.15, 474.2, 474.29, 364/474.33, 474.28; 318/569–579

[56] References Cited

U.S. PATENT DOCUMENTS

4,739,489  4/1988  Kishi et al. ...................... 364/474.29
4,745,558  5/1988  Kishi et al. ...................... 364/474.18

Primary Examiner—Roy N. Envall, Jr.
Assistant Examiner—Cameron H. Tousi
Attorney, Agent, or Firm—David C. Goldman; Paul R. Webb, II

[57] ABSTRACT

A method for generating tool paths for a profile milling task uses straight line (lacing) tool paths toward and away from the exterior boundary of a part to cover a first inset of a machining region. Recess areas which are difficult to reach with straight line access are blocked off, algorithmically, and closed loop tool paths are used for these regions. The remainder of the machining region having relatively regular boundaries are covered with lacing tool paths which are line segments followed by an arc following the part contour. Lacing eliminates the need for predrilling and takes advantage of the fact that most tools perform better when following straight paths. Information supplied by means of charts that assure the safety of milling successive tool paths without retraction, coupled with retraction requirements (also supplied), provide the parameters needed for automated optimal milling.

6 Claims, 7 Drawing Sheets fig. 1a fig. 1b fig. 1c fig. 2a fig. 2b fig. 3a fig. 3b fig. 3c fig. 3d fig. 4a fig. 4b fig. 6a fig. 6b

METHOD FOR AUTOMATING THE OPTIMIZATION OF TOOL PATH GENERATION FOR PROFILE MILLING

BACKGROUND OF THE INVENTION

Profile milling is a process of progressively removing a predetermined amount of stock material from a workpiece in order to contour a machined part or to create holes designed in the part. A vertical-spindle machine has the tool mounted in a permanent vertical position. The tool is mounted horizontally on a horizontal-spindle machine. In two and one-half (2½) axis milling the axis of the cutting tool is maintained in a fixed direction. The workpiece, which is firmly fixed on the machine table, moves freely in both the X and Y directions as the X and Y saddles slide along their respective way. Curved cuts are accomplished as both saddles slide along the two ways simultaneously.

For 2½ axis milling, no rotation about any axis is allowed. Thus free motion in the X and Y directions provides two milling axes, while the additional ½ axis of motion is provided by allowing the tool to move in successive steps toward and/or away from the table, i.e. in the Z direction. Once a Z-level for milling is established, all machine motion, following prescribed tool paths, is planar, meaning that Z is fixed. After removing prescribed stock material on the fixed Z-level, the tool is moved (usually) more deeply into the workpiece (stock material), and a new set of tool paths is initiated. In general, tool paths on each Z-level differ from those on previous levels. Appropriate incrementations in Z-levels for milling depend on the geometry of the part and surface quality required. Equations exist to guide the incrementation. During 2½ axis profile milling, material is removed along the shoulder of the tool as well as at the bottom. The implications are twofold: the tool paths must remain at least the distance of the tool radius from the part or gouging will result, and secondly that the geometry of the part must be such that no under cutting is required. Many parts satisfy this geometric requirement and 2½ axis profile milling is the most common type of part milling performed.

A tool path is the path or geometry that a tool must follow to mill or contour a designed part. General tool paths can be fit with as many linear and/or circular segments as required to meet required tolerance of accuracy to be made suitable for machines with limited modes of motion.

Computer generated control of the milling machine activity is officially called Numerical Control (NC) or Computer Numerical Control (CNC). NC replaces manual tool pathing and process control most effectively when the sequence of operations is complex and must be performed rapidly. With reliable NC, less dependence is placed on the operator's knowledge and experience with idiosyncrasies of the machine tool or of the part being milled, and the result is higher machine utilization and better parts. Automation also results in greater operator safety as all decisions about tool pathing, and tool retraction and control are under Numerical Control. Automated and optimized tool pathing allows designers to exercise more freedom in design of parts. Production of prototype parts becomes easier and faster, allowing rapid design review and design changes.

Parts being profiled or contour machined today are more complex, varied and intricate than those previously attempted. Today's parts have significant amounts of material to be removed, may have long, thin ribs or webs, and often have holes. Accurate, efficient tool paths are essential for success. What is needed is a system that, given geometric models of the workpiece, the part, avoidance and containment regions, acceptable scallop height, and desired tool radius, the system will automatically produce and optimize tool paths on suitably chosen successive Z-levels, generate machine code, and produce a tape or file containing all milling instructions required for milling the part.

SUMMARY OF THE INVENTION

An object of the invention is to automate optimal milling especially for clearing material from the contours of a part for 2½ axis milling tasks without manual intervention and within guidelines for good milling practices.

Another object of the invention is to provide a step from a solid model to a defined optimized process for automatically generating NC code for cutting tool paths, and to determine in which order the tool paths should be milled to maximize machine utilization.

Yet another object is to provide for containment regions to which milling is restricted and avoidance regions where milling is prohibited.

Still another object is to isolate finishing tool paths from roughing tool paths, and augment the former with tangential approach and exit routes.

According to one aspect of the invention, a method for generating optimal tool paths for profile milling uses geometric models of a part and stock metal from which the part is to be milled. Geometry of the milling region, that is those portions of stock material that must be removed by a cutting tool, are first algorithmically identified, and suitably enlarged using geometric and Boolean operations so that automated machining milling will remove all required stock material.

Additional features of the definition of the precise milling region is the allowance for containment and avoidance regions defined optionally by the user to avoid tool motion that would otherwise destroy extensions on the part or machine fixtures.

Additional features of the milling region definition involve the identification, by algorithmic means, of those portions of the milling region accessible to the cutting tool from at least one edge of the stock from those portions that are not. Lacing tool paths are generated to cover the former and closed loop tool paths are imposed on the latter. Finishing tool paths are provided to assure high surface quality.

A further feature is the technique shown of constructing continuous lacing tool paths by connecting linear segments across the milling region with curved segments that closely outline the part. These lacing tool paths then, by combining linear motion from and toward the edge of the machining region with contoured motion around segments of the part, mill large regions of the stock without pause for tool retraction.

A still further feature of the invention is the imposition of optimal ordering on the total set of tool paths generated so as to provide for maximal machine utilization and fewest tool retractions. Predrill locations are provided for required plunges of the tool.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

DETAILED DESCRIPTION OF THE INVENTION

The method of the present invention starts with a geometric computer model of a part to be milled and the stock or workpiece from which it is to be milled. A user designs this model using a solid modeling system such as is described in U.S. Pat. No. 4,618,924. Any solid modeling system such as is known in the art can be used for this purpose. The present invention is specifically directed to 2½ axis milling tasks. Continuous path milling is categorized by the number of axes under control. 2½ axis milling allows cutter control in the y and x direction and limited control in the z direction. The tool can only move in the z direction if the x and y values stay constant during the move. Tool paths are created at a series of planar cuts through a model of a part at different heights. All operations on the model described herein are mathematical operations. The conglomerate of tool paths from consecutive planar sections define the milling task for a particular part.

Geometric modeling systems provide the designer with the capability of modeling parts with recesses, holes and/or thin partitions, many of which are suitable for 2½ axis milling. At any fixed z-level, the tool must be constrained to move exterior to or on the boundary of regions milled on higher z-levels outside the part, and to remove material interior to or on the boundary of holes. Although 2½ axis machining is concerned with geometry on only one horizontal plane at a time, all tool motion must prevent accidental removal of material on higher levels. Maximum and minimum z-levels for milling are determined by the size of the metal workpiece and the design of the part.

Planar sections are passed through the part at various z-levels by the geometric modeling system. The exterior boundary of a part yields a closed curve. A complexity of nested and disjoint curves (closed loops) are obtained from sectioning through the interior features of the part. These features might be holes or recesses within the part. The conglomerate of all these curves is enclosed by the profile of the stock at that z-level, or of the containment region when milling is to be confined to a subset of the stock because of limited tool accessibility. A geometric definition of the machining region is required before proceeding to generate appropriate tool paths. Although appealing, the simple Boolean subtraction of the part configuration from the outline of the workpiece does not yield an appropriate definition of the machining region. Instead, a theoretical, two dimensional extension of the workpiece is required along its accessible sections so that tool paths created on the interior of this machining region will mill all stock material. This process is discussed in detail, and results in the entity called NEWSTOCK.

Two kinds of tool paths are described for covering the machining region, specifically lacing tool paths for regions accessible from outer edge of the stock, and closed loop tool paths for covering inaccessible regions. An optimization system is described in commonly assigned U.S. Pat. No. 4,907,164 which is incorporated herein by reference, in its entirety. The system therein is used to create and impose an optimizing ordering on all the closed loop tool paths created to cover regions of the workpiece lacing outside access. This includes, but is not limited to the interior holes and recesses of the part. Part of the algorithm included herein for profile milling, provides a technique using rays (straight lines) to locate regions the tool can not reach, enclose the regions and machine them using the optimized algorithm for closed loops. The remainder of the machining region, known to be accessible from the edge, is covered with lacing toolpaths.

Proper curve orientation is required for the part, the stock and avoidance and containment regions. An optimization system is described in commonly assigned U.S. Pat. No. 4,907,164 which is incorporated herein by reference, in its entirety. This optimization system allows the user to define these entities with arbitrary loop orientations, and the system imposes proper orientation on the loops, thus eliminating orientation requirements on the geometric modeler used.

Figure 1A:
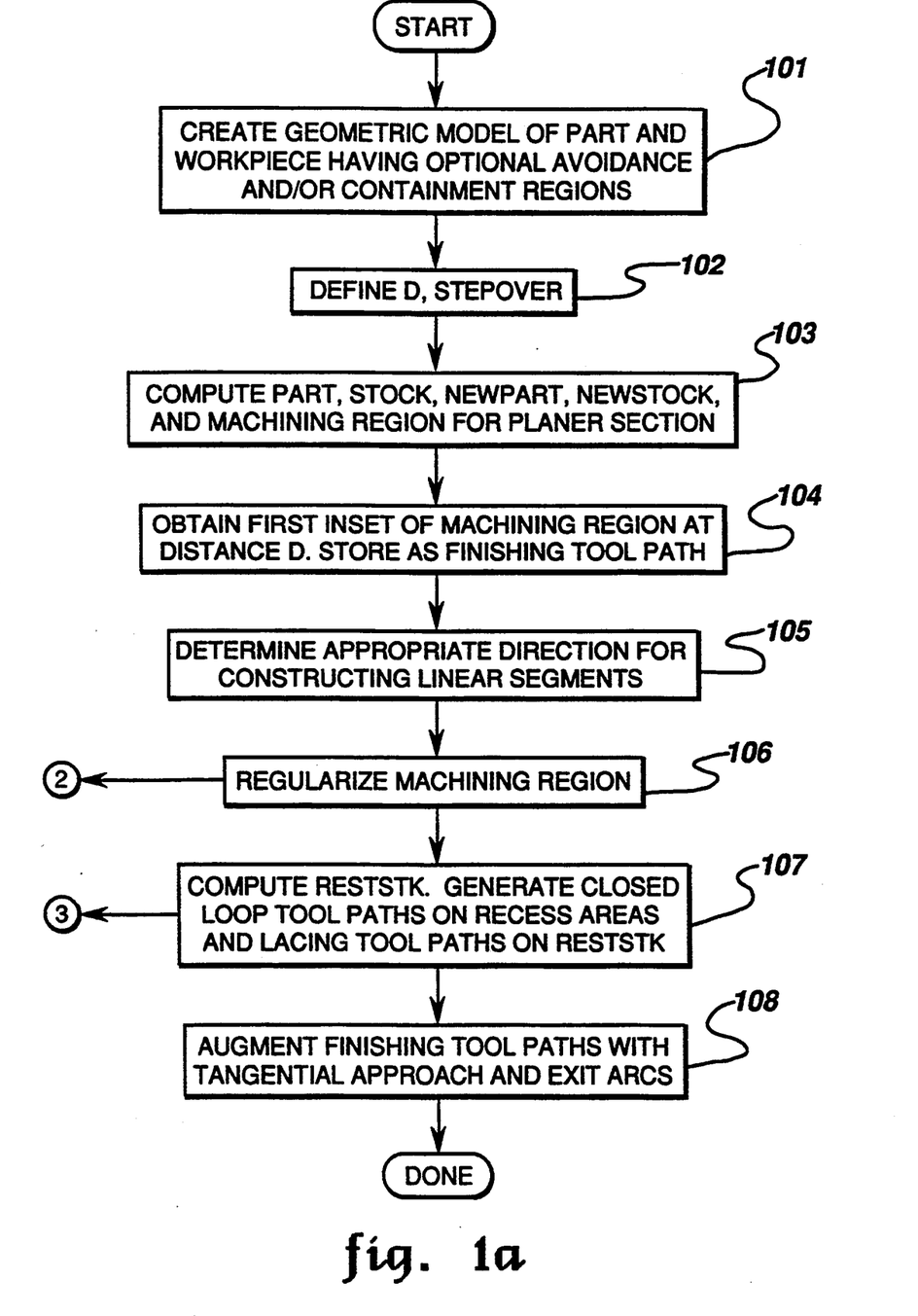
FIGS. 1a, b, and c are flowcharts showing an overview of the tool path generation procedures.
Figure 1B:
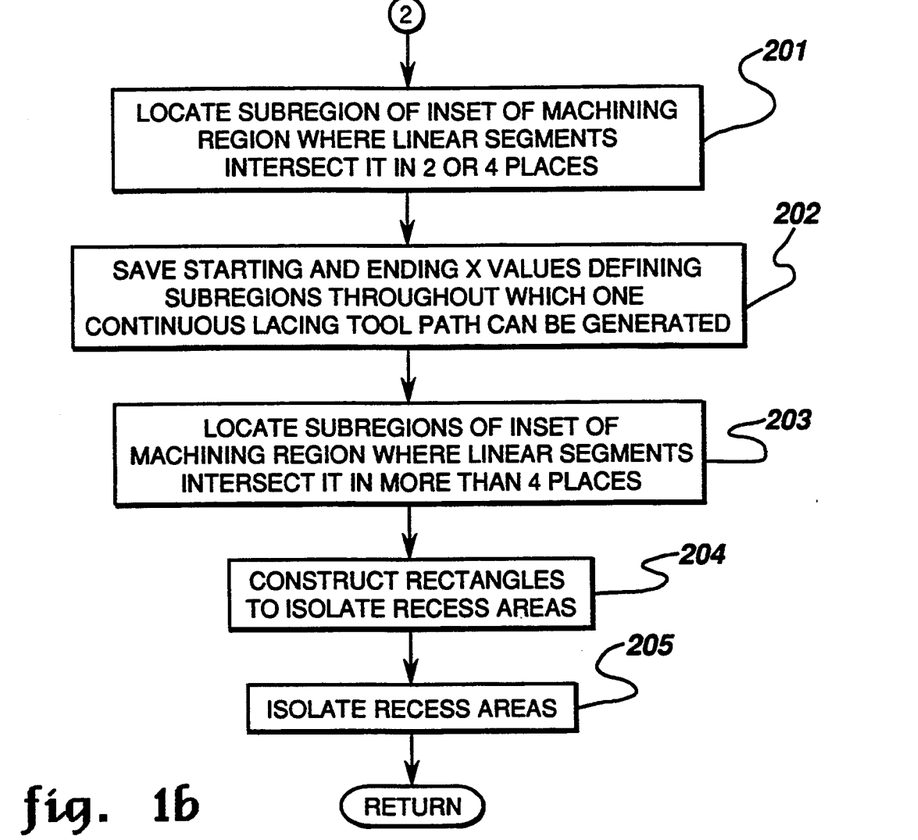
Figure 1C:
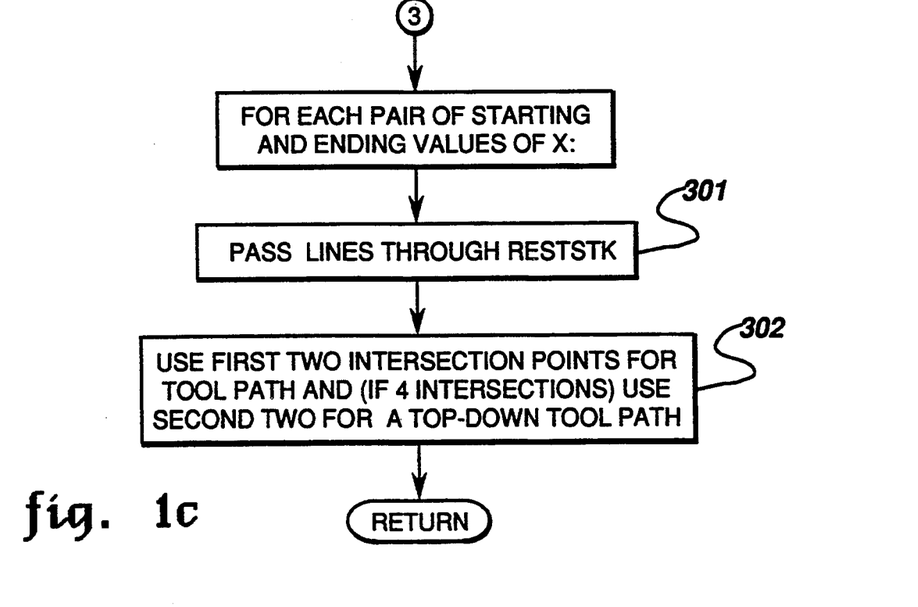

The major steps of the present invention are shown in flowchart form in FIGS. 1a, b, and c. In FIG. 1a, a user, at box 101 designs a geometric model of a part and stock which may contain avoidance or containment regions. Certain variables are next specified at box 102. D is the distance from the part profile for the first tool path, usually the radius of the machine tool (the cutter) to be used. STEPOVER is the distance between roughing tool paths. At box 103, the system computes the MACHINING REGION which is the area to be milled. At box 104 an inset of the MACHINING REGION is used to compute finishing tool paths. Next at box 105, a direction relative to the part is chosen to construct linear segments which will guide the construction of lacing tool paths. At box 106, the MACHINING REGION is regularized. This process is further described in FIG. 1b. At box 201, a subregion of the inset of MACHINING REGION is located in which linear segments intersect it in 2 or 4 places. Next, at box 202, the starting and ending x values defining subregions throughout which one continuous lacing tool path can be generated are saved. At box 203, subregions of the inset of MACHINING REGION where linear segments intersect in more than four places are located and at box 204 these recess areas are enclosed in rectangles so that all of the recess areas may be determined at once by taking the Boolean intersection of the MACHINING REGION and the rectangles as indicated at box 205. Returning to FIG. 1a, at box 107, the next step is to generate closed loop tool paths on recess areas and lacing loop tool paths on an area called RESTSTK. This step is shown in FIG. 1c where boxes 301 and 302 are repeated for each pair of starting and ending x values determined in box 202 of FIG. 1b. At box 301, lines are passed through RESTSTK at a distance of STEPOVER. At 302 the first two points of intersection are used for a bottom-up tool path and if there are two more intersections they will be used for a top-down tool path. Finally at box 108 of FIG. 1a, finishing tool paths are augmented with tangential approach and exit arcs. All of these steps will now be described in more detail with reference to the remaining illustrative figures and through the incorporation by reference of U.S. Pat. No. 4,907,164 which describes in particular the steps of generating an optimized ordered set of closed loop tool paths, details the augmentation of finishing tool paths with tangential arcs, and includes many pertinent definitions. The focus of the present invention, although it uses some of the techniques described in the aforementioned patent, is on the construction and use of lacing tool paths in combination with closed loop tool paths for profile milling.

Figure 2A:
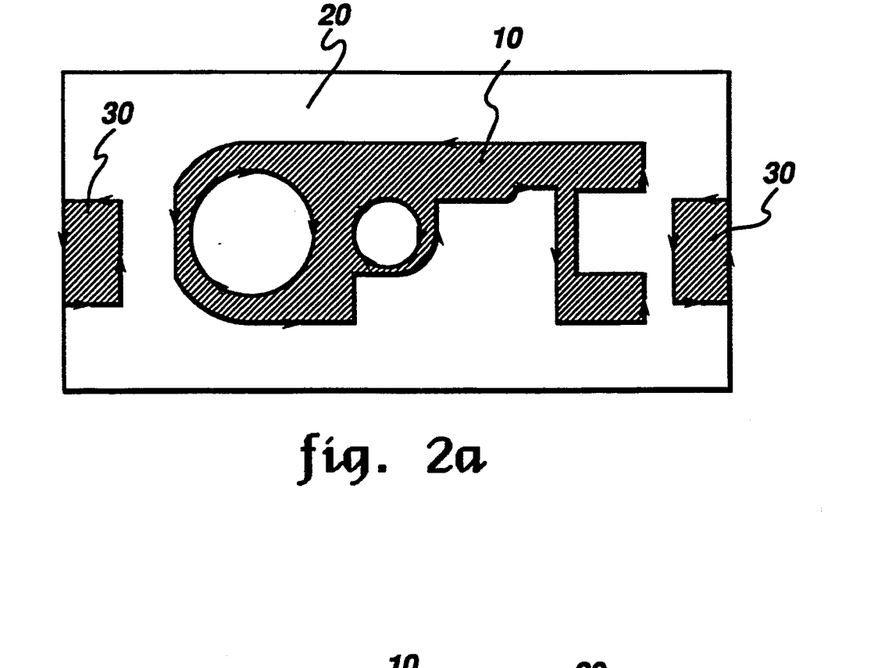
FIGS. 2a and b show a part and machining region on one two dimensional slice of a part model.
Figure 2B:
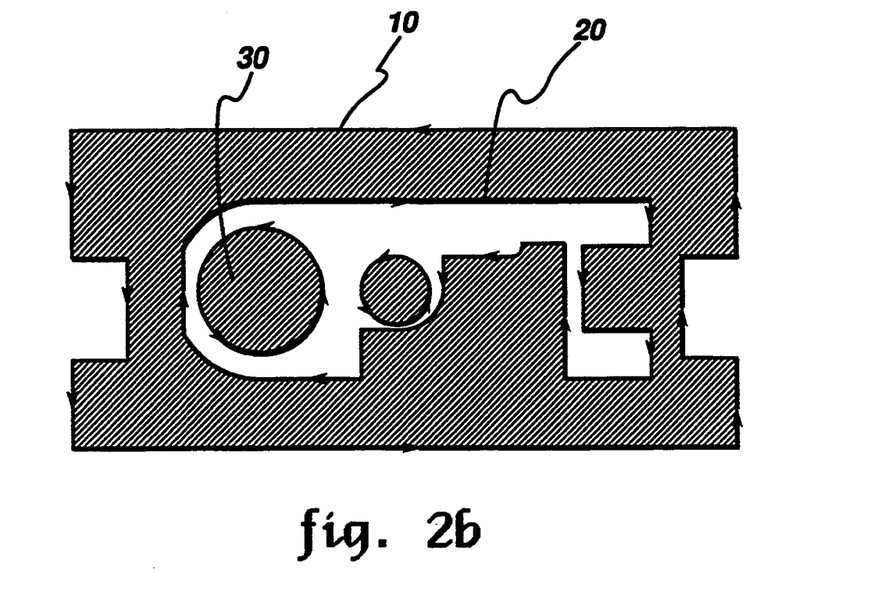

Referring now to FIG. 2a, part 10 is shown along with stock 20 from which part 10 is to be milled. Also shown is avoidance region 30, representing clamps which holds the stock while it is being cut. PART is defined as part 10 summed with all avoidance regions 30. PART can have any number of loops that are either properly nested or disjoint. STOCK is defined as the Boolean intersection of stock 20 with the sum of any containment regions. The geometric representation of STOCK may have an arbitrary number of loops that are properly nested or disjoint. NEWPART is defined as a PART - STOCK if PART extends outside STOCK, and if it does not, simply as PART. In FIG. 2a, NEWPART is shown as the hatched region.

A blind edge of stock is part or all of an edge of STOCK having coincidence with the PART. An accessible edge of stock is an outer edge of stock that is not blind. To determine the MACHINING REGION as for example for the part of FIG. 3a, the following algorithm is used.

Figure 3A:
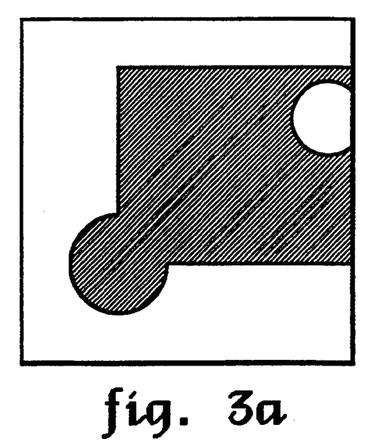
FIGS. 3a, b, c, and d show graphically the process of defining a machining region.
Figure 3B:
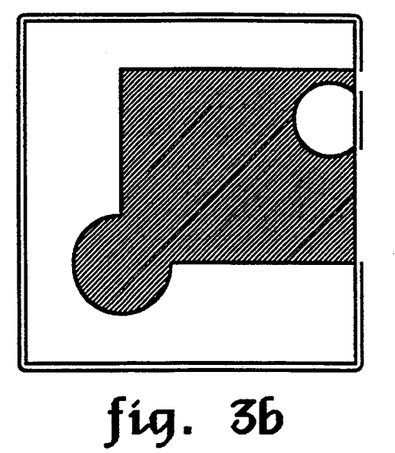
Figure 3C:
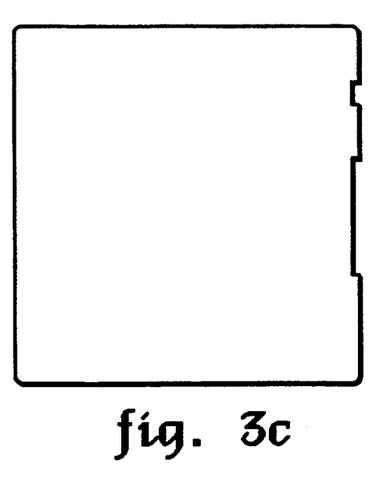

Intervals of coincidence between STOCK and NEWPART are identified and edges of STOCK are divided into categories of blind and accessible as shown in FIG. 3a. Each connected sequence of accessible edges is offset by a positive distance D which has been defined by a user as shown in FIG. 3b. The offset of a geometric curve is another curve representing the locus of all points a fixed distance from the original curve. Blind edges of STOCK are unaltered. Next as shown in FIG. 3c, NEWSTOCK, a theoretical enlargement of the stock is constructed according to the following process.

```
For each offset piece generated:
    test offset piece for intersection with adjacent
        BLIND edges. (Intersections will occur
        only if STOCK has concave portions).
    IF offset piece has no intersections
    THEN
        connect offset piece with adjacet BLIND
            edges by straight line segment
    ELSE
        subdivide offset arc(s) at points of
            intersection
        eliminate pieces of offset arcs extending
            beyond intersection
        connect clipped offset piece with adjacent
            BLIND edges
    ENDIF
END FOR loop
```

Figure 3D:
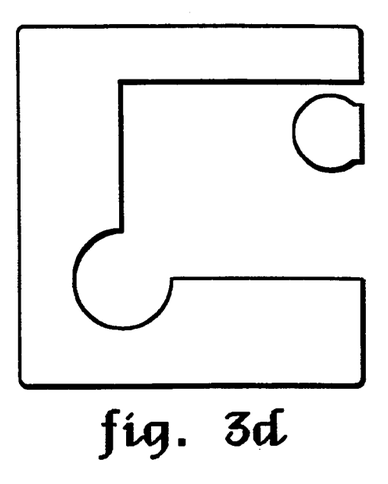

The MACHINING REGIONS, shown in FIG. 3d, are formed as NEWSTOCK - NEWPART (Boolean difference). This defines the regions of material that are to be milled, specifically those outside the profile of NEWPART and those that are inside holes of NEWPART. FIG. 3d shows that MACHINING REGION does not include any areas along which the part was coincident with the stock.

Figure 4A:
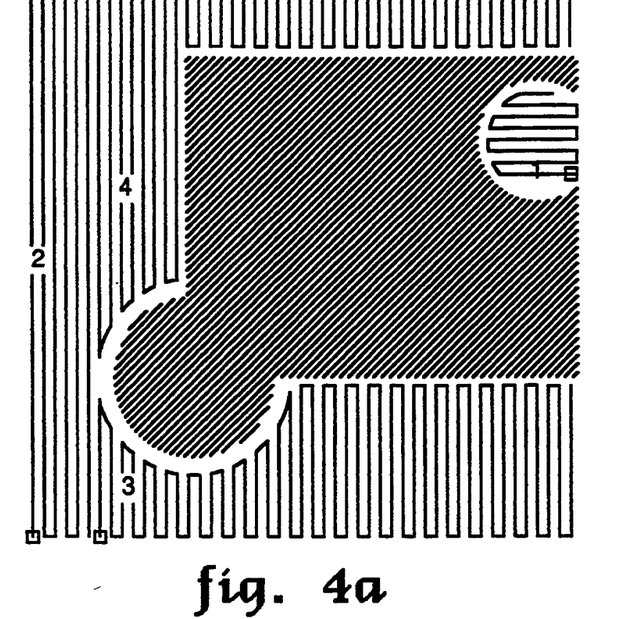
FIGS. 4a and b show lacing tool paths and finishing tool paths for a milling task.
Figure 4B:
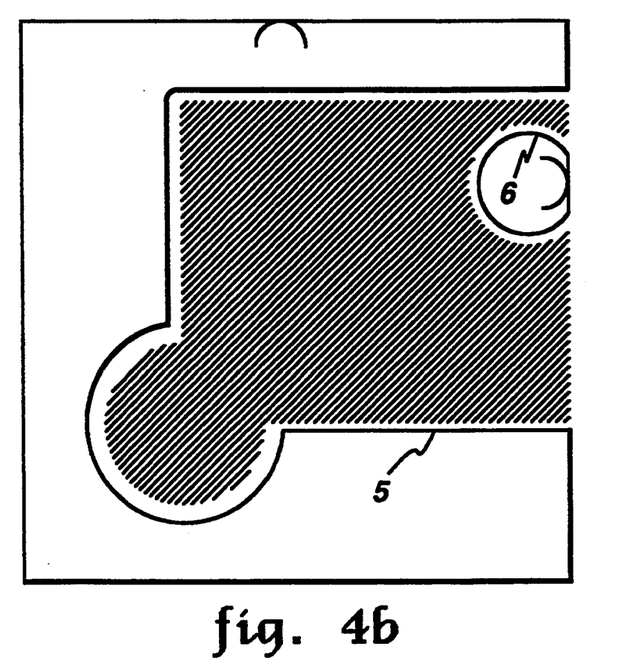
Figure 5A:
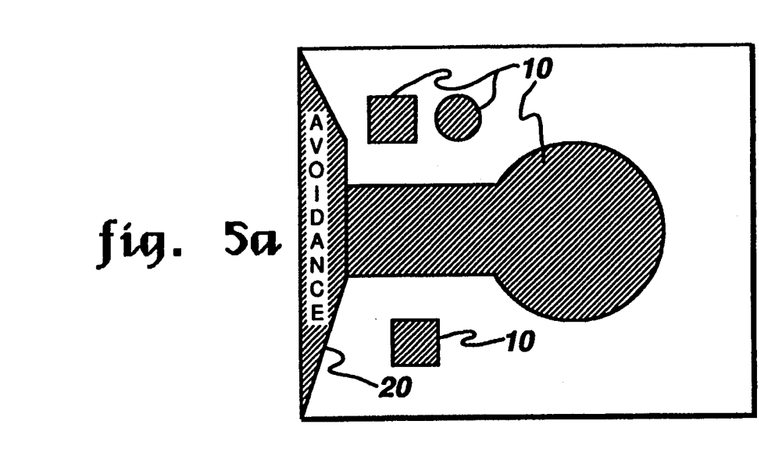
FIGS. 5a, b, c, and d show the process of isolating recess areas for closed loop tool paths.
Figure 5B:
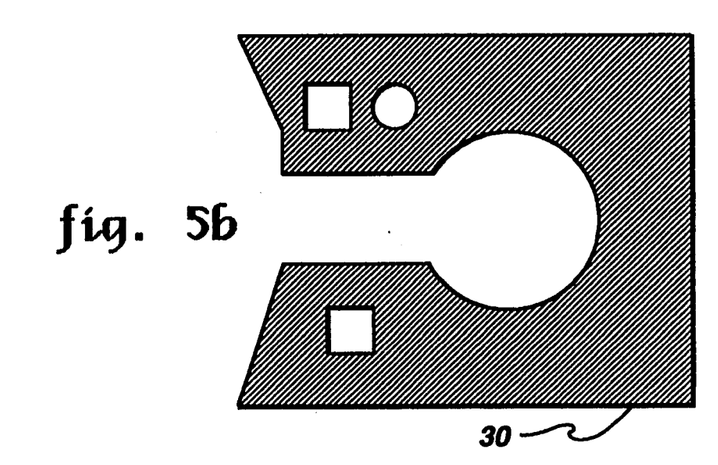
Figure 5C:
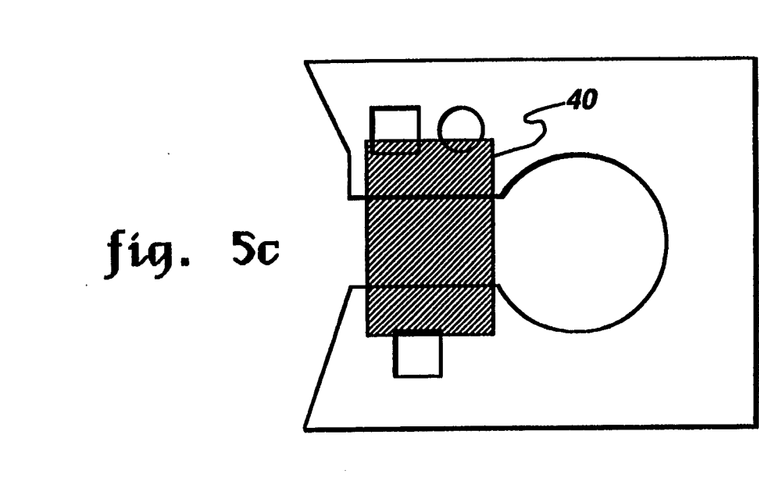
Figure 5D:
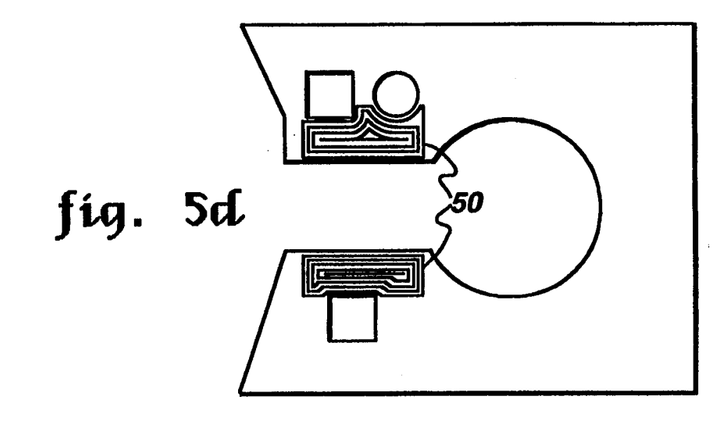

FIG. 4a shows tool paths numbered 1 through 4, toward and away from the exterior boundary of the part to cover the inset of the machining region. FIG. 4b shows the finishing tool paths 5 and 6 which provide the smooth surface finish required for the part. FIGS. 5a-d show a more complex part having separate sections. Recess areas difficult to reach with straight lines are blocked off and closed loop paths are used there. FIG. 5a shows a part consisting of four disjoint loops 10 and an avoidance region 20. FIG. 5b shows the resultant MACHINING REGION 30, having three interior holes. FIG. 5c shows a rectangle 40 generated to enclose regions not accessible by straight lines from the perimeter of the machining region. The region outside of rectangle 40 has relatively regular boundaries, and it is algorithmically feasible to generate lacing tool paths on it. The Boolean intersection of rectangle 40 and MACHINING REGION 30 define the sections to be covered with closed loop tool paths 50 as shown in FIG. 5d. The method described in U.S. Pat. No. 4,907,164 is used to generate and optimize the tool paths within the confines of these regions.

Figure 6A:
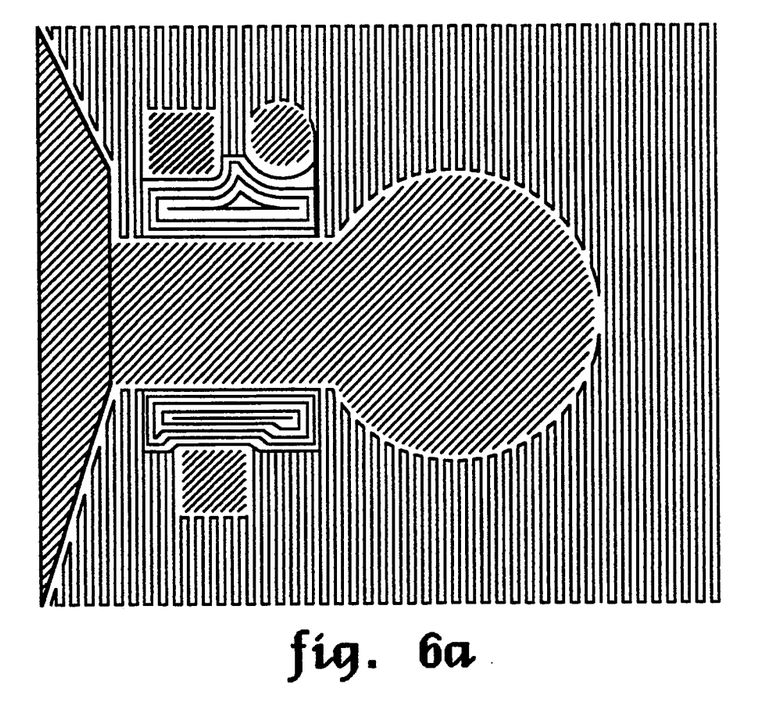
FIG. 6a shows the continuous, vertical lacing tool paths completely covering remainder of the machining region.

Lacing tool paths shown in FIG. 6a take advantage of the fact that some sections of the machining region can be accessed by the tool from the side of the stock, eliminating the need for predrilling of holes. Thus the fact that every lacing tool path starts at an edge of stock is significant. In addition, the paths zig-zag back and forth to mill large areas, thus reducing the number of individual tool paths. Some tools perform more efficiently when moving in horizontal or vertical directions than when following continuously curved paths.

Figure 6B:
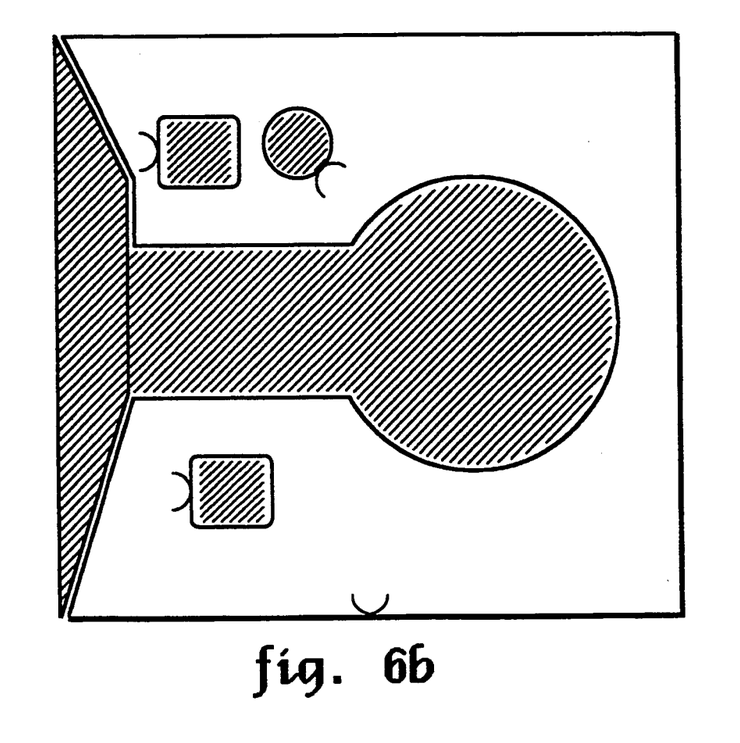
FIG. 6b shows finishing tool paths generated to smooth part surface.

Finishing tool paths shown in FIG. 6b eliminate cusps and rough edges left by the sudden change in tool direction required for back and forth tool motion. Interior, closed loop tool paths start at interior stock locations rather than edge locations, and predrill positions are provided for tool entry.

A top level overview of the sequence of steps required for the construction and optimizing process follows. Details to support this algorithm are provided in Appendix A in a pseudo-code format suitable to enable one skilled in the art to practice the present invention with an appropriately programmed digital computer.

GIVEN:
  composite curve created as a planar cross section at a fixed z-level through geometric model of the part and stock.

GOAL:
  build set of optimal LACE/LOOP tool paths to mill the part from defined stock shape using 2½ axis milling and meeting surface quality requirements.
    A. Construct model of an enlargement of the stock along ACCESSIBLE edges and connect suitable portions of the offset segments to the BLIND EDGES. This enlargement is called NEWSTOCK for convenience.

Define NEWPART as the Boolean difference:

| PART - STOCK | if part extends beyond |
|---|---|
| or PART | stock otherwise. |

Construct geometric model of MACHINING REGION by forming the Boolean difference: MACHINING REGION=NEWSTOCK - NEWPART.

B. Validate the MACHINING REGION to obtain the nesting organization of the curves.

Impose proper curve orientation according to nesting depth.

Initialize all counters to zero.

Mark all curves as initially unprocessed.

C. InteriorCounterClockWise (CCW) curves 30 have no edge access. Process each, using the closed loop cavity optimization process described in U.S. Pat. No. 4,907,164. Maintain optimized tool path ordering and predrill coordinate list.

Force tool retraction at end of processing for each CCW curve.

D. Process exterior CCW curves 10 with edge access and ClockWise (CW) curves 20 interior to them.

Obtain negative offset of this exterior portion of the MACHINING REGION thus forming the finishing curve, to be augmented later.

Decide vertical or horizontal directions for LACING tool paths based on extents of MACINING REGION.

E. Using rays (lines), locate sections of the MACHINING REGION inaccessible from edge of the stock, and create rectangles to enclose these inaccessible regions.

Impose CCW orientation on rectangles REGULARIZE the MACHINING REGION by subtracting these boxed inaccessible regions.

F. Generate optimized closed loop tool paths within rectangles using process described in C above.

G. Generate LACING tool paths on REGULARIZED region by generating continuous sequences of linear segments and contoured segments. Update tool path ordering as paths are generated.

H. Augment Finishing tool paths with tangential Approach wherever Possible.

While specific embodiments of the invention have been illustrated and described herein, it is realized that modifications and changes will occur to those skilled in the art. It is therefore to be understood that the appended claims are intended to cover all such modifications and changes as fall within the true spirit and scope of the invention.

APPENDIX

DETAILED ALGORITHM for Generating and Optimizing LACE/LOOP Toolpaths for 2 1/2 Axis Milling

```
GIVEN:
     composite curve created as a planar cross section
           at a fixed z-level through geometric model
           of the PART and STOCK
     distance D defined by user as distance from part of
           closest tool path.  Usually equal to radius
           of cutter tool to be used
     value of STEPOVER, or distance between successive
           tool paths
GOAL:
     build and order set of optimal LACE/LOOP tool paths
     to mill the part from defined stock shape using 2 1/2
     axis milling and meeting surface quality requirements.

A. Construct Model of Stock Enlargement and MACHINING REGION:

Construct model of NEWPART:
       IF PART extends beyond STOCK
       THEN
             NEWPART  =  PART  -  STOCK
       ELSE
             NEWPART  =  PART
       END IF
```

Define:
   BLIND EDGES as intervals of stock coincident with PART

ACCESSIBLE EDGES as intervals of stock NOT coincident
      with PART

Offset each ACCESSIBLE EDGE of stock at distance D. If
   any of these offset segments intersect adjacent BLIND
   edges, clip them at point of intersection.

Join BLIND EDGES and offset pieces by straight lines

Identify the stock enlargement as NEWSTOCK. Enlargement
   occurs along ACCESSIBLE edges only.

Construct model of MACHINING REGION as Boolean difference:

MACHINING REGION = NEWSTOCK - NEWPART which is the set of all points that are in NEWSTOCK but
   not in NEWPART, and thus defines the regions of material
   that are to be milled.

Note that as a result of this subtraction, the orientation
of each curve of the subtrahend (NEWPART in this case) is
reversed. What was a hole in NEWPART is now an outer
boundary of material in the MACHINING REGION. What was
the profile boundary of NEWPART now defines a hole in the
MACHINING REGION. Orientation of curves in the minuend
(NEWSTOCK in this case) is not altered.

B. Validate MACHINING REGION:
      to get NLOOP, the number of closed curves in the
            composite curve
      to obtain nesting of closed curves, i.e. which
            curves are inside which other curves
      to force proper orientation on the set of curves
            if not native to the curve.
   Set up mechanism for recording when a curve has
         been processed:

FOR K = 1 to NLOOP
         set  MARK(K) = 0      (MARK(K) = 0 means the Kth
      END FOR                   curve has not been processed.)

Set all counters to zero

C. Process interior CCW curves
   These curves have no side access and can not be
milled with LACE tool paths. Closed LOOPS are generated
by the CAVITY optimization process described in
U. S. Patent No. 4,907,164.

FOR  K = 1 to NLOOP
         IF CURVE (K) has CCW orientation and no
            interior curves
         THEN
            set  MARK (K) = 1    (processed)
            call the cavity optimization routine to
               process the curve

```
        FOR every entry in the output optimized
              list:

IF the entry is equal to -1 (retraction)
              THEN
                   add 1 to KNTLIST
                   set OUTLIST(KNTLIST) = -1

ELSE
                   get geometric representation of
                        tool path referenced in the list
                   add 1 to KNTPATHS
                   store geometry using newly incremented
                        value of KNTPATHS
                   add 1 to KNTLIST
                   set OUTLIST(KNTLIST) = KNTPATHS
              ENDIF

END FOR

Copy predrill coordinates
         Save geometry of finishing curves to be
              augmented later

END IF
   END FOR

D. Process CCW curves that DO have side access

FOR K = 1 to NLOOP
         IF MARK(K) = 0 and curve# K is CCW and curve# K
              has side access  (i.e. ACCESSIBLE edges)

THEN
              set MARK(K) = 1 find all CW curves interior to curve# K.  MARK
                   these elements as processed get geometry for this composite curve offset the composite curve at distance
                   negative D.

Store each closed curve of this offset as a
                   finishing tool path to be augmented later construct minimum box around offset curve
                   let XMIN = minimum x value of box
                   let XMAX = maximum x value of box
                   let YMIN = minimum y value of box
                   let YMAX = maximum y value of box construct minimum box around original stock
                   let XMINSTK = minimum x value of stock box
                   let XMAXSTK = maximum x value of stock box
                   let YMINSTK = minimum y value of stock box
                   let YMAXSTK = maximum y value of stock box
```

Decide direction for linear segments:
  IF XMIN = XMINSTK and YMIN = YMINSTK
  THEN
        build linear segments left to right
            and bottom/up ELSE IF XMIN = XMINSTK and YMAX = YMAXSTK
  THEN
        build linear segments left to right
            and top/down ELSE IF XMAX = XMAXSTK and YMAX = YMAXSTK
  THEN
        build linear segments right to left
            and top/down ELSE IF XMAX = XMAXSTK and YMIN = YMINSTK
  THEN
        build linear segments right to left
            and bottom/up ELSE IF YMIN = YMINSTK
  THEN
        build linear segments left to right
            and bottom/up ELSE IF YMAX = YMAXSTK
  THEN
        build linear segments left to right
            and top/down ELSE IF XMIN = XMINSTK
  THEN
        build linear segments right to left
            and bottom/up ELSE IF XMAX = XMAXSTK
  THEN
        build linear segments right to left
            and top/bottom ELSE
        use closed loop optimization only

END IF

END IF

END FOR

E. Algorithm for 'REGULARIZING' the machining region

Details here define the case where LACING tool paths are generated from left to right and from bottom/up. Minor adjustments of this logic are appropriate for vertical or top/down direction.

Set:
    XINCR <---- STEPOVER   (distance between linear
                            segments defined by user)

To 'regularize' the machining region, areas that are
not easily reached by the tool are isolated, blocked
off and handled separately (see G below.) A table
of starting and ending x-values, on the range from
XMIN to XMAX, is created identifying remainning
regions throughout which one continuous lacing tool
path can be formed. The table is generated while
locating the regions to be blocked off.

To build the table:

Set   XVAL = XMIN
    Construct vertical line at X = XVAL
    Enter XVAL in the table
    Find the number of intersections of this line with
        the MACHINING REGION Set Add XINCR to XVAL
    DO WHILE XVAL less than or equal to XMAX Construct vertical line at X = XVAL
        Find all intersections of the line with the
                MACHINING REGION
        IF the NUMBER OF INTERSECTIONS is different
                from the last NUMBER OF INTERSECTIONS
        THEN
            record XVAL in the table
            if number exceeds four, process as discussed
                below
        END IF

END DO WHILE

Enter value XMAX in table

A 'REGULARIZED' region will intersect a vertical line
in two or four distinct places. If the number is two
throughout the interval XMIN to XMAX, the region has
no interior curve, and one continuous lacing tool path
can be constructed to cover the region. If the number
is 4 throughout the region, there are no concave recesses
and the region can be covered with one lacing tool path
from bottom/up and a second one from top/down. A change
in the number of intersections indicates a change in the
structure of the region. Any change in the number of
intersections signals the end of one lacing tool path.
The next x-value will start the adjacent tool path. The
table records start and end values for vertical lacing
tool paths.

More than four intersections imply the line is cutting
across an interior concave recess which should be
blocked off. The first time a recess is identified, a
flag is set and the minimum and maximum x and y values encountered for that recess throughout the range of
successive lines (obtained by adding XINCR to XVAL)
are recorded. The intent at this point is to define a
rectangle around the recess. The recording for the
current recess ends when either the number of
intersections drops to four or less, or XVAL > XMAX.
If the number of intersections goes from 6 to 8, or 6
to some higher, even integer, two or more overlapping
recesses are indicated. These are treated as a single
recess, and one rectangle is built around all of them.

If the number of intersections is odd, the line is
tangent to a boundary curve. By constructing lines
slightly before and after the current line and noting
how the number of intersections differs, the tangency
can be identified and handled. A condition that can
not be handled, and which will cause an error, occurs
when the line being passed is tangent to an even number
of finishing curves at the same time. In this case,
the resultant number of intersections is even, and the
tangency conditions will not be identified.

At the conclusion of this step the following data are
   available:

number of lacing tool paths from bottom/up to
           be constructed
       beginning and ending x-value for each bottom/up
           or top/down tool path
       number of interior recesses identified
       minimum and maximum dimensions to define a
           rectangle enclosing each recess.

F.  Algorithm for Generating Tool Paths for Isolated
    Interior Areas FOR each rectangle defined:

Find the boolean intersection of the rectangle
        and the MACHINING REGION. This defines the
        closed-off recess exactly.

Generate optimized closed loop tool paths for
        each interior area, maintaining output lists.
           This process is identical with C above and
           uses the optimization process described
           in U. S. Patent No. 4,907,164.

END FOR

G. Algorithm for Generating LACING tool paths

Construct:
       RESTSTK = MACHINING REGION - (SUM of rectangles)
           These are boolean operations.

Lacing tool paths to cover RESTSTK require a vertical
   line starting from the edge of stock toward the part,
   a segment following the contour of the part offset,
   having horizontal chordal length equal to STEPOVER, a
   vertical line from segment end point to the stock edge
   followed by a horizontal move along the contour of the
   stock of chordal length STEPOVER. Essentially the tool
   path zig/zags (without retraction) between the periphery
   of the stock and the offset of the part. The latter was
   created in step D. This construction is repeated until
   XVAL assumes the table value for ending the current tool
   path. Orientation of the contoured segment is required
   when tool motion is opposite to the native orientation
   of the curve.

FOR each pair of X-values (START and END) in table:

Set XVAL = START
       Construct vertical line at constant XVAL, generate
           and count number of intersections with RESTSTK.
           By construction there will be either two or 4.
       IF number of intersections is 4
       THEN
           record XVAL and the last two intersections in a
               new table for construction of top/down lacing
               tool paths to be constructed later.
       END IF
       Using first 2 intersections, build line and curve
               segments for tool path
       add XINCR to XVAL
       DO UNTIL XVAL > XMAX
           construct line at constant XVAL, generate and count
               number of intersections with RESTSTK.
           using first 2 intersections, build line and curve
               segment for tool path
           add XINCR to XVAL
       END DO UNTIL
       add 1 to number of tool paths
       store tool path on disk using this incremented number
       add tool path to output list, and follow it with the
               retraction indicator.

END FOR

Construct top/down LACING tool paths similarly.

H. Augment Finishing tool paths with tangential Approach
           and Exit

Each finishing curve is to be augmented if possible. The
   best chance for successful augmentation is on a long arc.
   Augmentation fails at this location if the added tangential
   circular arcs intersect the finishing curve. Augmentation for this finishing curve is impossible if it fails for
every arc of the finishing curve.

Starting with arc of longest chordal length on finishing
         curve:

Find midpoint, M, of the arc

Locate center of circle of radius D along line perpen-
         dicular to the arc at M Construct two ninty degree arcs using center/radius data Test circular arcs for intersection with the curve. An
         intersection at any point other than the midpoint
         indicates the augmentation fails at this location.

IF success
    THEN
         add approach arc and the exit arc to geometric
         representation of the finishing curve. Some
         preference might exist for dividing these approach
         and exit arcs into two pieces ELSE
         try augmenting a different arc if any not tried.

END IF

What is claimed is:

1. A method for generating tool paths for profile milling of parts comprising the steps of:
   creating a geometric model of a part and stock from which said part is to be milled;
   defining a first region on said stock within which a cutting tool has access from at least one side of said stock;
   defining a plurality of second regions on said stock within which at least a portion of said regions are not accessible by a cutting tool from a side of said stock, said defining a plurality of second regions comprising defining a machining region; locating areas within said machining region where linear segments intersect said machining region in more than four places, said areas defining concave recesses; connecting all of said areas with a rectangle; and finding the Boolean intersection of said machining region with said rectangle and designating said intersection as said plurality of second regions;
   generating lacing tool paths on said first region, said lacing tool paths being a path starting at an edge of the stock zig-zagging back to the part; and
   generating closed loop tool paths on said second regions.

2. The method of claim 1 further comprising the step of:
   generating a finishing tool path having tangential approach and exit arcs.

3. The method of claim 1 further comprising the step of imposing ordering for the milling of the tool paths with retraction requirements to accomplish optimal milling.

4. The method of claim 1 wherein the step of defining a first region comprises the steps of:
   defining a machining region; and
   locating areas within said machining region where linear segments intersect said machining area in 2 or 4 places.

5. The method of claim 1 wherein said step of generating lacing tool paths comprises the steps of:
   subtracting said rectangle from said machining region, thereby defining a regularized area;
   locating sub-areas on said regularized area where linear segments intersect said regularized area in two places;
   locating sub-areas on said regularized area where linear segments intersect sub-areas in four places; and
   generating individual lacing tool paths for each of said sub-areas.

6. The method of claim 1 wherein said step of creating a geometric model creates a geometric model of said part and stock allowing containment regions and avoidance regions.

* * * * *